US009652952B2

(12) United States Patent
Boudet et al.

(10) Patent No.: US 9,652,952 B2
(45) Date of Patent: May 16, 2017

(54) DEVICE FOR DETECTING THE THEFT OF AN OBJECT

(71) Applicants: Commissariat a L'Energie Atomique et aux Energies Alternatives, Paris (FR); Evolution Consulting, Seyssel (FR)

(72) Inventors: Thierry Boudet, Echirolles (FR); Francois Foschia, Seyssel (FR)

(73) Assignees: Commissariat à l'Energie Atomique et aux Energies Alternatives, Paris (FR); Evolution Consulting, Seyssel (FR)

( * ) Notice: Subject to any disclaimer, the term of this patent is extended or adjusted under 35 U.S.C. 154(b) by 0 days.

(21) Appl. No.: 14/142,184

(22) Filed: Dec. 27, 2013

(65) Prior Publication Data
US 2014/0184412 A1    Jul. 3, 2014

(30) Foreign Application Priority Data

Dec. 27, 2012 (FR) ..................................... 12 62836

(51) Int. Cl.
G08B 13/14 (2006.01)
G06K 19/07 (2006.01)
G08B 21/02 (2006.01)

(52) U.S. Cl.
CPC ......... G08B 13/14 (2013.01); G06K 19/0701 (2013.01); G08B 13/1409 (2013.01); G08B 13/1436 (2013.01); G08B 13/1463 (2013.01); G08B 21/0297 (2013.01)

(58) Field of Classification Search
CPC G08B 13/1427; G08B 13/2402; G08B 21/24; G08B 21/0227; A44C 19/00; G06K 19/0701; G06K 19/0704; G06K 7/0008

USPC ........... 340/568.1, 571, 572.1, 568.2, 573.4, 340/539.21, 686.6, 539.32, 539.13
See application file for complete search history.

(56) References Cited

U.S. PATENT DOCUMENTS

| 4,800,369 A | * | 1/1989 | Gomi et al. ............... 340/568.2 |
| 5,014,040 A | * | 5/1991 | Weaver et al. ............ 340/568.1 |
| 5,245,317 A | * | 9/1993 | Chidley et al. ............... 340/571 |
| 5,640,144 A | * | 6/1997 | Russo ................ G08B 13/1427 340/531 |
| 5,652,570 A | * | 7/1997 | Lepkofker ............ A61B 5/1112 340/407.1 |
| 5,774,876 A | * | 6/1998 | Woolley et al. ................ 705/28 |
| 6,154,139 A | * | 11/2000 | Heller ................. G08B 3/1083 340/572.1 |

(Continued)

FOREIGN PATENT DOCUMENTS

BE          1 006 701       11/1994
WO    WO 2006057804         6/2006

OTHER PUBLICATIONS

Institut National De La Propriete Industrielle, Preliminary Search Report issued in connection with French Patent Application No. 12/62836, Jul. 25, 2013, 2 pages.

Primary Examiner — Hoi Lau
(74) Attorney, Agent, or Firm — Moreno IP Law LLC

(57) ABSTRACT

A device for detecting the theft of an object, intended to be integrated to said object, includes an antenna for receiving a remote-supply signal and means for detecting an interruption of the remote-supply signal. Means for delivering an alarm signal when the interruption of the remote-supply signal is detected are also provided.

5 Claims, 3 Drawing Sheets

(56) References Cited

U.S. PATENT DOCUMENTS

| | | | | |
|---|---|---|---|---|
| 6,300,875 B1* | 10/2001 | Schafer | G01S 19/16 | |
| | | | 340/539.1 | |
| 6,392,547 B1* | 5/2002 | Stewart | G08B 13/1427 | |
| | | | 340/539.23 | |
| 6,661,336 B1* | 12/2003 | Atkins | G06K 7/0008 | |
| | | | 340/10.1 | |
| 6,990,047 B1* | 1/2006 | Barbagiovanni et al. | 368/10 | |
| 7,034,684 B2* | 4/2006 | Boman | G08B 13/1427 | |
| | | | 340/539.11 | |
| 7,551,092 B1* | 6/2009 | Henry | G08B 21/245 | |
| | | | 340/286.07 | |
| 8,810,392 B1* | 8/2014 | Teller | G08B 21/24 | |
| | | | 235/385 | |
| 2002/0177476 A1* | 11/2002 | Chou | G01S 5/0027 | |
| | | | 455/574 | |
| 2004/0212500 A1* | 10/2004 | Stilp | G08B 19/005 | |
| | | | 340/541 | |
| 2005/0134459 A1* | 6/2005 | Glick | G08B 13/1427 | |
| | | | 340/572.1 | |
| 2005/0174235 A1* | 8/2005 | Davis | G06Q 10/08 | |
| | | | 340/539.13 | |
| 2005/0231366 A1* | 10/2005 | McHugh | G08B 13/1445 | |
| | | | 340/568.2 | |
| 2005/0285739 A1* | 12/2005 | Velhal | G08B 21/0227 | |
| | | | 340/572.1 | |
| 2006/0238347 A1* | 10/2006 | Parkinson | G08B 13/1436 | |
| | | | 340/572.4 | |
| 2007/0115137 A1* | 5/2007 | Lyon | G01S 13/767 | |
| | | | 340/8.1 | |
| 2007/0120698 A1* | 5/2007 | Turk et al. | 340/686.6 | |
| 2007/0141997 A1* | 6/2007 | Wulff | G06K 19/0723 | |
| | | | 455/78 | |
| 2007/0152829 A1* | 7/2007 | Lindsay | G06K 19/0717 | |
| | | | 340/572.3 | |
| 2007/0159338 A1* | 7/2007 | Beber | G06K 19/0704 | |
| | | | 340/572.8 | |
| 2007/0222587 A1 | 9/2007 | Crider et al. | | |
| 2008/0030325 A1* | 2/2008 | Fries | G06K 19/0701 | |
| | | | 340/539.32 | |
| 2008/0030345 A1* | 2/2008 | Austin | A61B 90/98 | |
| | | | 340/572.8 | |
| 2008/0042846 A1* | 2/2008 | Jenkins | H01Q 1/2216 | |
| | | | 340/572.7 | |
| 2008/0048866 A1* | 2/2008 | Hahn | G01D 9/005 | |
| | | | 340/572.4 | |
| 2008/0061967 A1* | 3/2008 | Corrado | G06K 7/10079 | |
| | | | 340/539.26 | |
| 2008/0079547 A1* | 4/2008 | Alicot | H04B 1/525 | |
| | | | 340/10.3 | |
| 2008/0100439 A1* | 5/2008 | Rinkes | G06K 7/0008 | |
| | | | 340/572.1 | |
| 2009/0109027 A1* | 4/2009 | Schuller | G08B 25/10 | |
| | | | 340/568.1 | |
| 2009/0231127 A1* | 9/2009 | Angell | G06K 7/0008 | |
| | | | 340/539.22 | |
| 2009/0256672 A1* | 10/2009 | Yamamoto | G06Q 10/08 | |
| | | | 340/5.2 | |
| 2009/0295593 A1* | 12/2009 | Park | G08B 21/0275 | |
| | | | 340/6.1 | |
| 2010/0277280 A1* | 11/2010 | Burkart | H04Q 9/00 | |
| | | | 340/10.1 | |
| 2010/0283602 A1* | 11/2010 | Tsai | G08B 21/0269 | |
| | | | 340/539.13 | |
| 2010/0289646 A1* | 11/2010 | Raniere | G08B 13/14 | |
| | | | 340/572.1 | |
| 2012/0249798 A1* | 10/2012 | Kim | H04W 4/028 | |
| | | | 348/159 | |
| 2012/0298758 A1* | 11/2012 | Vishwanath | 235/492 | |
| 2013/0093590 A1* | 4/2013 | Sivalingam | A44C 19/00 | |
| | | | 340/571 | |
| 2013/0265139 A1* | 10/2013 | Nummila | G01K 1/024 | |
| | | | 340/10.1 | |
| 2013/0271280 A1* | 10/2013 | Alnafisah | G06F 19/322 | |
| | | | 340/539.13 | |

* cited by examiner

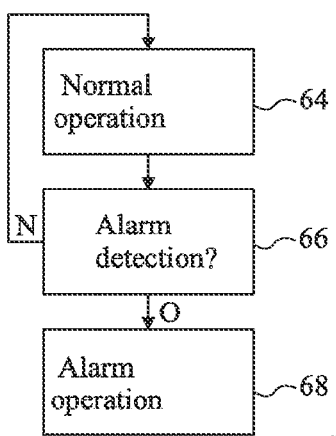
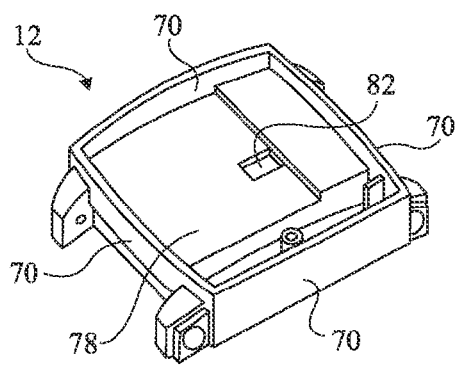
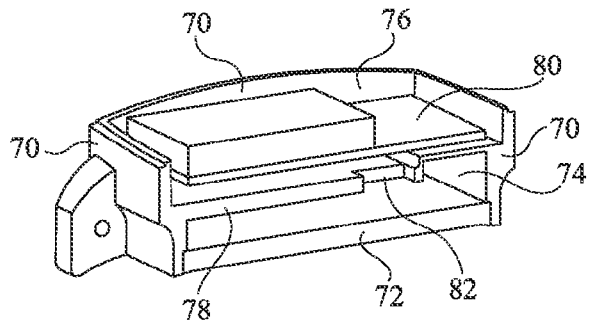
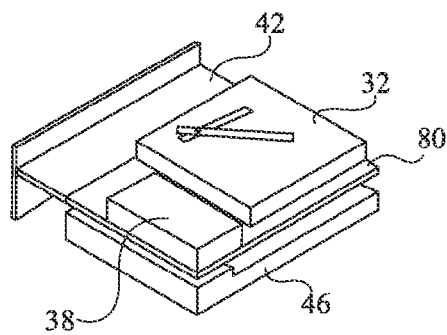
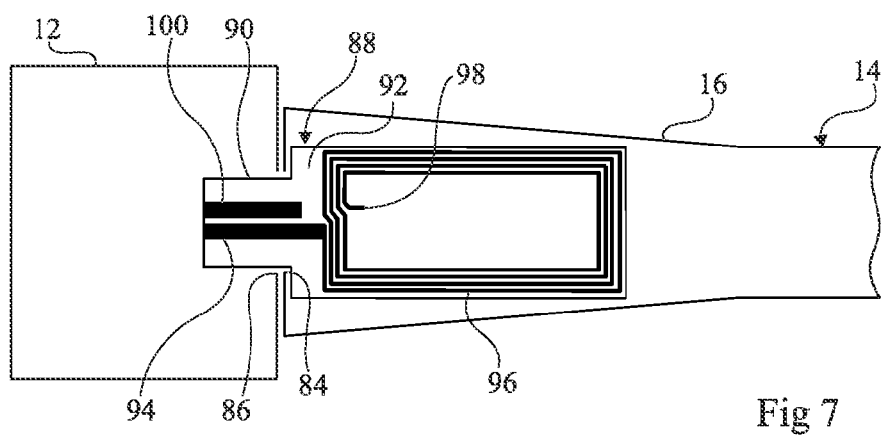

DEVICE FOR DETECTING THE THEFT OF AN OBJECT

FIELD

The present disclosure relates to a device for detecting the theft of an object, particularly a timepiece or jewelry item, for example, a watch in a shop-window.

BACKGROUND

Shops displaying valuable items should be fitted with monitoring and/or alarm devices to prevent such items from being stolen. An example of monitoring device comprises monitoring cameras installed on the premises where valuable items are displayed. According to an example, the alarm device comprises a sensor capable of detecting the removal of an object from its display and an emitter of a sound alarm when the object is removed from the display. According to another example, the alarm device transmits an alert signal when an item is removed from its display, for example, to the police or to a security service.

However, such devices are not efficient in the case of armed robberies. Indeed, in this type of theft, robbers do not mean to act inconspicuously. The robbers may further be masked to avoid being recognized on video images. Further, because of the short duration of the robbery, the robbers may have already left the premises before the police or a security service can intervene.

SUMMARY

Thus, a device for detecting the theft of an object, intended to be integrated to said object, is here provided, the device comprising:
an antenna for receiving a remote-supply signal;
means for detecting an interruption of the remote-supply signal; and
means for delivering an alarm signal when the interruption of the remote-supply signal is
detected.

According to an embodiment, the device further comprises a sensor of the displacement of said object.

According to an embodiment, the alarm signal delivery means is capable of delivering said alarm when a displacement of the object is detected.

According to an embodiment, the device further comprises means for determining the position of the object.

An object comprising a case at least partly containing the device such as defined hereinabove is also provided.

According to an embodiment, the case has an external aspect imitating the aspect of a timepiece and/or jewelry item.

According to an embodiment, the case has the aspect of a watch case.

According to an embodiment, the object further comprises a strap containing the remote-supply signal reception antenna.

A system comprising the previously-defined object and a support of said object is also provided, the support comprising a remote-supply signal transmission antenna.

A method of detecting the theft of an object is also provided, which comprises:
the reception of a remote-supply signal by a receive antenna contained in the object;
detecting an interruption of the remote-supply signal; and
delivering an alarm signal when the interruption of the remote-supply signal is detected.

According to an embodiment, the alarm signal is delivered, when the interruption of the remote-supply signal is detected, only if a displacement of the object is detected.

The foregoing and other features and advantages will be discussed in detail in the following non-limiting description of specific embodiments in connection with the accompanying drawings.

BRIEF DESCRIPTION OF THE DRAWINGS

FIG. 3 shows in the form of a block diagram an embodiment of a theft detection method;

FIG. 4 is a perspective view of a portion of the case of the device of FIG. 1;

FIG. 5 is a simplified perspective view, in cross-section, of the device of FIG. 1;

FIG. 6 is a perspective view of elements contained in the case of the device of FIG. 1;

FIG. 7 is a simplified view of an antenna for charging by induction the device of FIG. 1;

DETAILED DESCRIPTION

Figure 1:
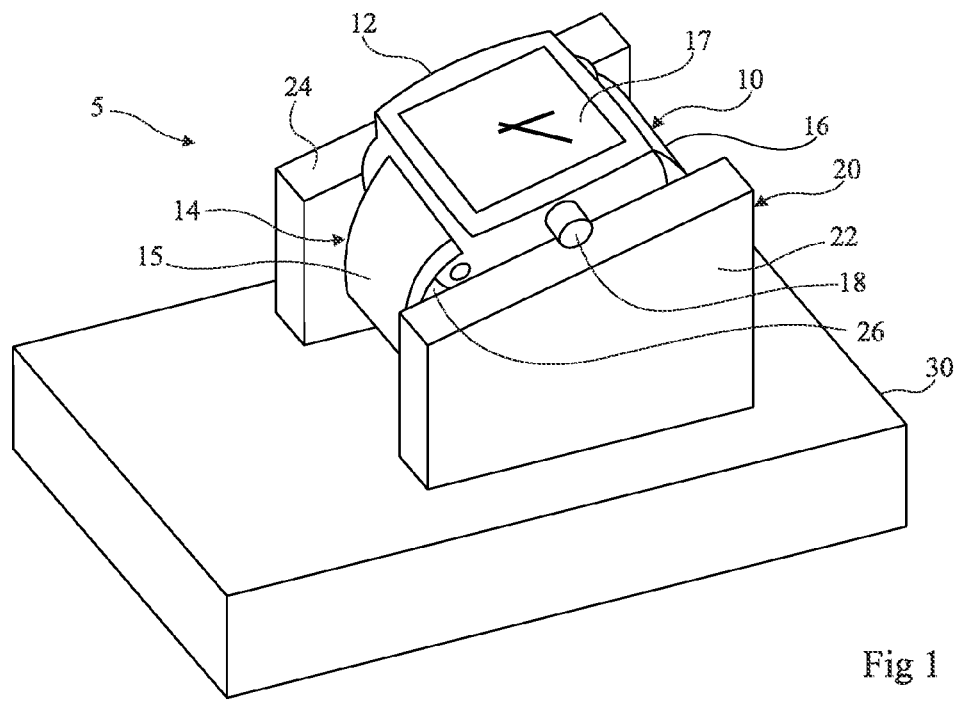
FIG. 1 is a perspective view of an embodiment of theft detection device.

For clarity, the same elements have been designated with the same reference numerals in the various drawings and, further, the various drawings are not to scale. Further, only those elements which are useful to the understanding of the present disclosure have been shown and will be described. In the following description, unless otherwise indicated, terms "substantially", "approximately", and "in the order of" mean "to within 10%".

There exist theft detection devices comprising a tracking device, for example, a device of geographic location or geolocation, by satellite or GPS (for Global Positioning System) which may be integrated to an object likely to be stolen. The geographic coordinates of an object provided with a geolocation device may be transmitted over a wireless connection, for example, by using a Short Message Service or SMS. Thus, in case of theft, the position of the object can be tracked.

However, such monitoring devices have several disadvantages.

Indeed, an alarm message is generally emitted when a displacement of the object provided with the monitoring system is detected. However, such a theft detection device may result in the emitting of an alarm message while there is no theft, for example, in the case where the display supporting the object is displaced for maintenance operations.

Such monitoring devices may be too bulky to be hidden in objects likely to be stolen. Such is for example the case for valuable items, particularly of timepiece or jewelry items, which may have small dimensions.

The object should comprise a cell or a battery for powering the tracking device and the alarm message transmission device when the object is removed from the display. It is desirable for the tracking device to remain powered as long as possible in case of theft, so that the tracking of the position of the stolen object occurs for the longest possible time. This imposes for the battery charge state to be maintained substantially at a maximum level as long as the object has not been stolen. This may require a periodic recharging of the cell, which is not desirable. However, the battery cannot be charged by a visible D.C. power supply system. Indeed, a thief should not suspect that the stolen object is provided with a tracking device.

Thus, an object of an embodiment is to overcome all or part of the disadvantages of previously-described theft detection devices.

Another object of an embodiment is for the power supply of the battery of the theft detection device not to be visible from the outside of the object provided with the theft detection device.

Another object of an embodiment is to decrease risks of theft detection error.

Another object of an embodiment is for the object provided with the theft detection device to have a small size.

FIG. 1 shows an embodiment of a theft detection device 5 according to the invention. Device 5 comprises an object, forming a decoy, having the aspect of an object likely to be stolen. In the present embodiment, device 5 comprises a fake watch 10 having a case 12 and a strap 14. The dimensions of watch 10 correspond to those of a conventional watch. Strap 14 comprises two strap portions 15, 16, each portion 15, 16 being attached to case 12 at one end. Case 12 has the outer shape of a watch case and comprises, for example, a dial 17 with hands and a stem 18. However, these are preferably dummy elements which are not functional.

Fake watch 10 is arranged on a stand 20. Stand 20 has the aspect of watch stands generally used for clocks and watches. Stand 20 for example comprises two lateral flanges 22, 24 on either side of watch 10 and a cylindrical portion 26 connecting the two flanges 22, 24. Strap 14 of watch 10 may be arranged around cylindrical portion 26.

Stand 20 rests on a display 30. Real watches are also arranged on display 30 around fake watch 10. Thus, in case of theft, there is a high probability for fake watch 10 to be stolen along with the surrounding watches. In case of theft, watch 10 only or watch 10 along with stand 20 may be stolen.

Figure 2:
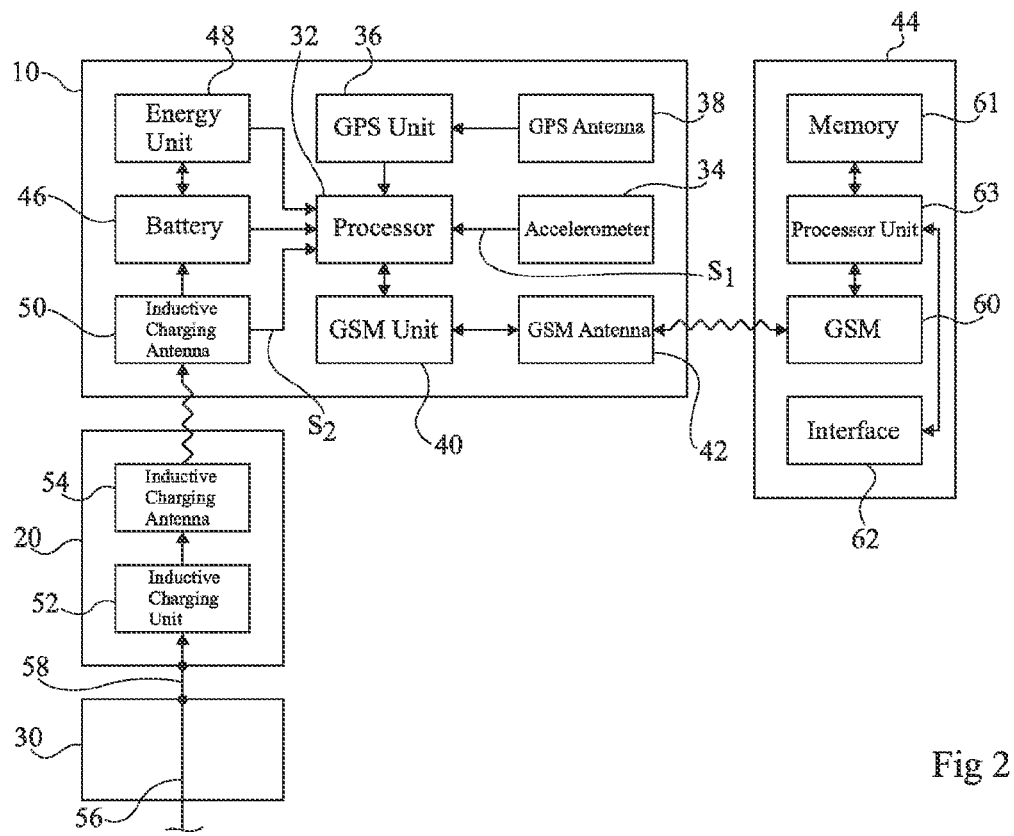
FIG. 2 schematically shows the elements of the device of FIG. 1.

FIG. 2 schematically shows elements contained in fake watch 10 and stand 20 according to an embodiment.

Watch 10 comprises:
a processor 32, for example, a microcontroller;
an accelerometer 34 connected to processor 32 and capable of providing processor 32 with a signal representative of the acceleration of watch 10;
a satellite geolocation unit 36, for example, a GPS tracking unit, connected to processor 32 and to an antenna 38 (GPS Antenna), unit 36 being capable of providing processor 32 with a signal representative of the geographic coordinates of watch 10;
a telecommunication unit 40 (GSM Unit), connected to processor 32 and to an antenna 42 (GSM Antenna), capable of exchanging data with a server 44 via a mobile telephony telecommunication network, for example, a GSM (Global System for Mobile communications) unit or a UMTS (Universal Mobile Telecommunications System) unit;
a power storage unit 46 (Battery) capable of powering all the components of watch 10, for example, a lithium battery of high energy density and high power, provided, for example, with silicon electrodes, particularly an accumulator described in publication "Structural Changes in Silicon Anodes during Lithium Insertion/Extraction" by M. N. Obrovac and L. Christensen (Electrochemical and Solid-State Letters, 7 (5) A93-A96 (2004));
a unit for controlling battery 48 (Energy Unit), connected to processor 32 and to battery 46, capable of driving processor 32 according to the charge state of battery 46; and
a receive antenna 50, connected to battery 46, to unit 32 and 48, and capable of receiving a remote-supply signal for the charge of battery 46 by inductive coupling.

In the present embodiment, stand 20 comprises a generator 52 (Inductive Charging Unit) connected to a radiofrequency transmission antenna 54. When watch 10 is arranged on stand 20, receive antenna 50 is substantially arranged opposite to transmit antenna 54 so that an energy transfer by inductive coupling may be obtained between transmit antenna 54 and receive antenna 50. As an example, generator 52 is powered with a voltage, for example, a D.C. voltage of approximately 12 V, and provides transmit antenna 54 with a voltage oscillating at several megahertz, for example, at approximately 113.5 MHz.

Display 30 comprises an electric cable 56 connected to an external power source, not shown, for example, the electric network or a D.C. voltage source.

Stand 20 is connected to display 30 by an electric connector 58 which provides an electric connection between cable 56 and transformer 52. Generator 52 is capable of controlling antenna 54 for the provision of energy. Preferably, connector 58 is an electric connector with pressed contacts, for example, of the type used to connect a wireless phone to its power supply base. As a variation, the stand and the display may be connected by inductive coupling, so that an energy transfer occurs from the display to the stand.

Server 44 comprises:
a telecommunication unit 60 (GSM), capable of exchanging data with unit 40;
a data storage system 61 (Memory) for example comprising a volatile memory;
an interface 62 enabling to exchange data between server 44 and other systems and for example enabling to connect server 44 to the Internet; and
a data transfer system 63 (Processor Unit) connected to telecommunication unit 60, to data storage system 61, and to interface 62.

FIG. 3 illustrates an embodiment of a theft detection method.

Step 64 corresponds to an operation of fake watch 10 in the absence of theft. Watch 10 is then arranged on stand 20, which is itself laid on display 30, as shown in FIG. 1. Stand 20 is then electrically connected to display 30 by connector 58. Battery 46 is then charged with the energy delivered by generator 52, by inductive coupling between transmit antenna 54 and receive antenna 50. Preferably, energy management unit 48 controls the charge of battery 46 to permanently maintain the charge state of battery 46 at more than 90%.

In the absence of theft, processor 32 may control the sending to server 44, for example, periodically, of a message by GSM unit 40 to indicate the proper operating state of watch 10.

Operating parameters of watch 10 may be modified by a user via server 44. Server 44 may transmit control signals to watch 10, particularly to modify the geographic coordinate transmission frequency in the case of an alarm, to set to stand-by the GPS tracking and/or the GSM tracking, to require, locally, geographic coordinates or to verify the charge state of battery 46.

At step 66, processor 32 determines whether a theft has occurred. In case of a theft detection, the method continues at step 68. When no theft is detected, the method carries on at step 64. Step 66 may be carried out simultaneously at above-described step 64.

Processor 32 receives from accelerometer 24 a signal S1 representative of the acceleration of watch 10. As an example, signal S1 is zero when the acceleration of watch 10 is zero and is different from zero when the acceleration of watch 10 is different from zero. Processor 32 further receives from receive antenna 50 a signal S2 representative of the fact that energy is received by antenna 50. As an example, when signal S2 is different from zero, this means that antenna 50 receives energy from antenna 54 and when signal S2 is zero, this means that antenna 50 receives no energy from antenna 54.

The lack of reception of a remote-supply signal by antenna 50 may correspond to a situation where watch 10, with stand 20, has been removed from display 30. Thus, the electric power supply of stand 20 by display 30 is interrupted, which causes the interruption of the inductive coupling between stand 20 and watch 10.

The lack of reception of a remote-supply signal by antenna 50 may also correspond to a situation where watch 10 has been removed from stand 20, and the distance separating receive and transmit antennas 50 and 54 is too large to allow a coupling therebetween.

According to an embodiment, processor 32 determines that a theft attempt occurs when signal S2 is zero. According to another embodiment, to avoid risks of false alarms, processor 32 determines, when antenna 50 is no longer powered, whether watch 10 is simultaneously moving. Processor 32 then determines that a theft attempt has occurred if signals S1 and S2 are simultaneously zero.

At step 68, processor 32 sets to an alert mode. It then receives from GPS unit 36 the geographic coordinates of watch 10 and controls GSM unit 40 to transmit to server 44 these coordinates, for example, incorporated to short messages which correspond to alarm signals. Telecommunication unit 60 may then correspond to an SMS server.

Server 44 may provide a service of real-time tracking of the position of watch 10. In case of alert, server 44 may transmit an alert message to the users of this service. It may be an e-mail or a short message. The alert message may comprise a connection link towards an Internet site. The data recovered by server 44 may be consulted on this Internet site. In particular, a map with the position of watch 10 may be displayed on this Internet site.

In certain cases, GPS unit 36 may not be capable of determining the geographic coordinates of watch 10, for example, in the absence of detection of signals from the GPS system satellites. The position of watch 10 can then be determined by using the mobile telephony telecommunication network by any adapted tracking method. As an example, the tracking method may implement a method using the identifiers of GSM antennas or Cell ID method, or a triangulation method based on the data obtained by three relay antennas of the mobile telephony telecommunication network.

FIGS. 4, 5, and 6 show an embodiment of case 12 of watch 10 and of elements contained in the case. Case 12 is made of a material substantially transparent to electromagnetic waves used by GPS and GSM antennas 38 and 42. Case 12 comprises lateral portions 70 which define, with dial 17, not shown in FIGS. 4 to 6, and a bottom 72, a lower housing 74 and an upper housing 76 separated by an intermediate wall 78. As an example, lower housing 74 has a height of approximately 7 mm, a length of approximately 35 mm, and a width of approximately 25 mm. As an example, upper housing 76 has a height of approximately 7 mm, a length of approximately 35 mm, and a width of approximately 35 mm.

Battery 46 is located in lower housing 74. Preferably, bottom 72 is removable to ease the access to battery 46, for example, for maintenance purposes. A printed circuit 80 is provided in upper housing 76. Processor 32, GSM unit 40, GPS unit 36, energy management unit 48, accelerometer 34, GSM antenna 42, and GPS antenna 38 are connected or formed by components connected to printed circuit 80. Intermediate wall 78 comprises a through opening 82 enabling to electrically connect battery 46 to printed circuit 80.

FIG. 7 shows an embodiment of antenna 50. The contours of case 12 and of portion 16 of strap 14 of the watch are further schematically shown. Strap 14 is made of a material transparent to electromagnetic waves, for example, made of leather or of plastic matter. Strap portion 16 comprises a slot 84 at one end. Case 12 comprises a slot 86 substantially arranged in front of slot 84. Antenna 50 is formed on a flexible printed circuit 88 mainly arranged in portion 16 of strap 14 and which comprises an end portion 90 which penetrates into slots 84, 86 to emerge into case 12. Printed circuit 88 comprises on a surface 92 a conductive track comprising a first end portion 94 extending in a portion 96, spirally arranged and forming four spirals, portion 94 extending in a second end portion 98. An additional conductive portion 100 is also provided on surface 92 and is arranged parallel to end portion 94. Portion 94 is connected to end portion 98 by a conductive track arranged on the surface, not shown in FIG. 7, of printed circuit 88 opposite to surface 92 and by vias crossing printed circuit 88. End portions 94, 100 are for example connected to printed circuit 80.

As an example, the spirals of antenna 50 have a generally rectangular shape, the spiral of largest dimensions being inscribed within a rectangle having a length of 40 mm and a width of 20 mm.

Figure 8:
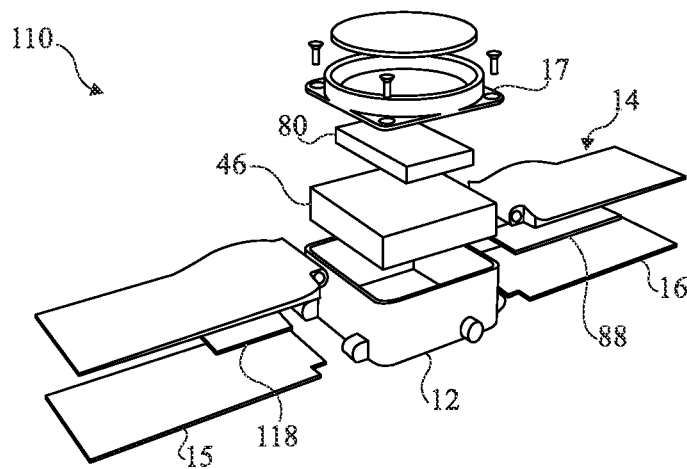
FIG. 8 is a simplified exploded view of another embodiment of the theft detection device.

FIG. 8 shows a simplified exploded perspective view of another embodiment of a watch 110. Watch 110 comprises all the elements of watch 10, with the difference that GPS antenna 38 and GSM antenna 42 are not contained in case 12 but are arranged in strap 14. This embodiment has the advantage that sizing constraints to form GPS antenna 38 and GSM antenna 40 are lower than for watch 10.

Figure 9:
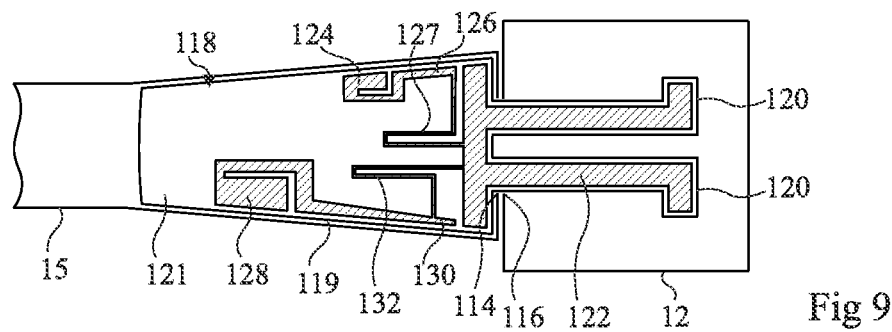
FIG. 9 is a simplified view of an antenna of the device of FIG. 8.

FIG. 9 shows an embodiment of GPS antenna 38 and of GSM antenna 42 for watch 110 of FIG. 8. The contour of case 12 and of portion 15 of strap 14 of the watch is further schematically shown. Strap portion 15 comprises a slot 114 at one end. Case 12 comprises a slot 116 arranged substantially in front of slot 114. Antennas 38, 40 are formed on a flexible printed circuit 118 having its largest portion 119, of trapezoidal shape, arranged in portion 15 of strap 14 and which comprises two tabs 120 penetrating into slots 114, 116 to emerge into case 12. Printed circuit 118 comprises on a surface 121 of printed circuit 118 a conductive track 122 which extends on each tab 120 and on the base of trapezoidal portion 119. Track 122 is connected to a source of a reference potential, for example, the "ground" of printed circuit 80. Flexible printed circuit 118 further comprises a spiral track 124 having its base 126 connected to track 122 by a narrower track 127. Printed circuit 118 further comprises a spiral track 128 having its base 130 connected to track 122 by a narrower track 132. A conductive wire, not shown, is connected to base 126 and another conductive wire is connected to base 130, the wires being connected to the printed circuit.

Figure 10:
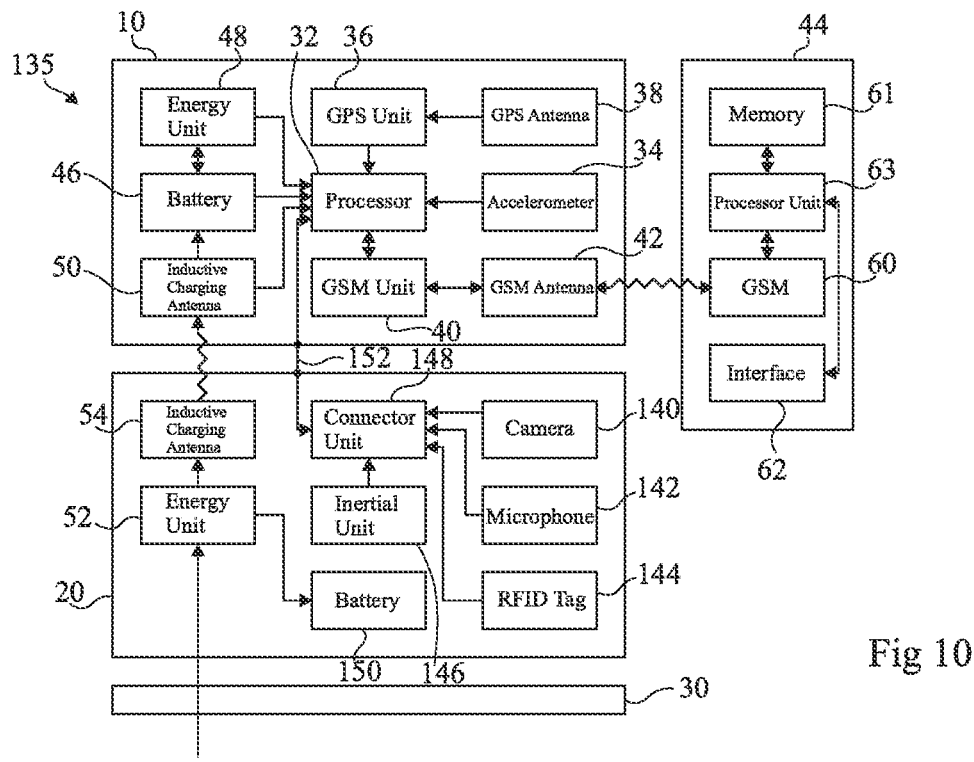
FIG. 10 schematically shows the elements of another embodiment of the theft detection device.

FIG. 10 schematically shows the elements of another embodiment of theft detection device 135. Device 135 comprises all the elements shown in FIG. 2 and further comprises additional elements aiming at improving the tracking of watch 10 and of stand 20 in case of theft.

Stand 20 further comprises:
one or more than one camera 140 capable of acquiring images, for example, a video camera and/or an infrared camera;
a microphone 142 capable of acquiring a sound signal;
a radiofrequency tag 144 (RFID Tag);
an inertial unit 146;
a connection unit 148 connected to these components; and
an energy storage system 150 for the power supply of the components of stand 20.

The electric connection between stand 20 and watch 10 is formed by a contact connection 152, for example, a pressed contact connection. Processor 32 is connected to connection unit 148 by connection 152 when watch 10 rests on stand 20. Energy management unit 52 controls the charge state of battery 150.

Connection unit 148 is capable of controlling the data exchange between processor 32, on the one hand, and cameras 140, microphone 142, inertial unit 146, and possibly RFID tag 144 on the other hand.

As an example, in case of theft, cameras 140 are capable of acquiring video images of the surroundings of stand 20. Processor 32 may control the transmission to server 44 of these video images by GSM unit 40. Similarly, in case of theft, microphone 142 is capable of recording the noise, for example, conversations, around stand 20. Processor 32 may comprise the transmission to server 44 of this sound recording by GSM unit 40.

Inertial unit 146 for example comprises six accelerometers and a rate gyro, and is capable of providing signals representative of geographic coordinates of stand 20. In the absence of theft, processor 32 may control, at regular intervals, the providing of geographic coordinates by GPS unit 36 and transmit these coordinates to inertial unit 146 so as to readjust inertial unit 146. In case of theft, processor 32 may control the transmission to server 44, by GSM unit 40, of the geographic data provided by inertial unit 146. Inertial unit 146 may be used when the satellite signals for the tracking of watch 10 by GPS unit 36 are not available.

Server 44 may compare the position provided by inertial unit 146 with the position provided by the GSM tracking. If the difference between the two positions is greater than a threshold, for example, 50 m, server 44 may control the provision of new GPS coordinates to readjust inertial unit 46.

Radiofrequency tag 144 may be used for an accurate tracking of stand 20. The satellite tracking, the GSM tracking, and/or the tracking by the inertial unit, may be used to obtain approximate geographic coordinates of the position of watch 10 and/or of stand 20. A user provided with a radiofrequency tag detector can then go to the location indicated by the approximate geographic coordinates and search, by means of the detector, for the accurate position of stand 20. Radiofrequency tag 144 may be an active tag. In this case, it is powered by battery 150. As a variation, radiofrequency tag 144 may be a passive radiofrequency tag. In this case, it is possible for it not to be connected to another electronic component of stand 20.

As a variation, only one of the elements or some of the elements from among cameras 140, microphone 142, inertial unit 144, and radiofrequency unit 144 may be present.

According to another variation, stand 20 may comprise a telecommunication unit capable of exchanging data with server 44 via a mobile telephony telecommunication network, for example a GSM unit or a UMTS unit. According to this variation, it is possible for connection 152 and for connection unit 148 not to be present. The data provided by cameras 140, microphone 142, or inertial unit 146 may be transmitted to server 44 directly by stand 20 via this telecommunication unit.

Specific embodiments have been described. Various alterations, modifications, and improvements will readily occur to those skilled in the art. In particular, although, in the previously-described embodiments, the detection of the watch motion is performed by an accelerometer, it should be clear that the detection of the watch motion may be performed by any motion sensor, for example comprising a rate gyro or a magnetometer. Further, although, in the previously-described embodiments, the theft detection device is arranged in a watch, it should be clear that the theft detection device may be arranged in another object, particularly a jewelry item, for example, a bracelet or a collar. Further, it should be noted that those skilled in the art may combine various elements of these various embodiments and variations without showing any inventive step.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. An object (10) comprising a case (12) and a device (5; 135) for detecting the theft of the object (10), intended to be integrated to said object, the device comprising:
an antenna (50) for receiving a remote-supply signal;
a second antenna (42);
an accelerometer (34);
means (32) for detecting an interruption of the remote-supply signal and for detecting a displacement of said object from a signal provided by the accelerometer;
means (40) for delivering an alarm signal via the second antenna when the interruption of the remote-supply signal and the displacement of the object are simultaneously detected; and
a battery (46) capable of powering all components of the object and capable of being charged with the remote-supply signal,
wherein the case at least partly contains the detection device and wherein the case (12) has an external aspect imitating the aspect of a timepiece and/or jewelry item.

2. The object of claim 1, wherein the detection device (5; 135) further comprises means (36) for determining, the position of the object.

3. The object of claim 1, wherein the case (12) has the aspect of a watch case.

4. The object of claim 3, further comprising a strap (14) containing the remote-supply signal reception antenna (50).

5. A system comprising the object (10) of claim 1 and a support (20) of said object, the support comprising an antenna (54) for transmitting the remote-supply signal.

\* \* \* \* \*